Jan. 21, 1958 S. E. EGAN 2,820,309

RECORD IDENTIFICATION MEANS

Filed Aug. 10, 1955

INVENTOR.
STUART E. EGAN

BY Richard von K. Brune
Attorney 2,820,309
Patented Jan. 21, 1958

2,820,309

RECORD IDENTIFICATION MEANS

Stuart E. Egan, Detroit, Mich.

Application August 10, 1955, Serial No. 527,622
6 Claims. (Cl. 40—2)

This invention relates to identification means for phonograph records, and has particular reference to an exceedingly simple yet practical device for enabling quick identification of phonograph records stored in racks, cabinets, and the like.

Disc phonograph records are normally provided with center labels which identify the musical composition or other recording that is on the record. When, however, these records are stored in the proper edgewise manner in a record rack or cabinet, it is impossible to see the labels without removing the records from the rack. Thus, each time a particular record is sought for playing, it may be necessary to withdraw quite a number of records from the rack before the desired one is found. This problem occurs also when the records are kept in individual paperboard envelopes since these generally lack sufficient thickness to permit the printing of any identifying information on the edge thereof.

In order to eliminate this problem and enable rapid identification of the individual records stored in a rack or cabinet, the present invention contemplates the provision of a very simple record identification device comprising a tab member adapted to project from the peripheral edge of the record and flexible means for detachably securing the tab in edge engaging position while the record is stored in the rack. The tab member bears the title or other identifying indicia for the record and since it projects outwardly from the edge thereof, any record can be quickly located by means of its tab without having to remove a number of records from the rack to examine the labels thereon. The tab securing means is constructed so that the tab can be easily attached to and removed from the record, and it is adapted for use with records of various sizes. The device closely engages the sides of the record, and occupies but little additional space, so that it in no way interferes with the sliding of the record into or out of the rack and can be used even though the record is kept in a paperboard envelope.

Accordingly, with the foregoing and other considerations in view, it is the primary object of this invention to provide a simple yet practical phonograph record identification device for enabling quick identification of records stored in racks, cabinets or the like.

Another important object of the invention is to provide an identification device for phonograph records which can be quickly and easily attached to and detached from the record, and is flexible so that it can be utilized with records of various sizes.

Still another important object of the invention is to provide an identification device for phonograph records which engages the record in such a manner that it does not materially add to the bulk thereof and can be used whether the record is kept in a paperboard envelope or not.

A further important object of the invention is to provide a phonograph record identification device which is of a durable construction and yet can be mass produced by simple, low cost methods.

Other objects and advantages of the invention will become apparent from the following detailed description thereof read in conjunction with the accompanying drawings which illustrate typical embodiments of the invention for the purpose of disclosure.

Having reference now to the drawings, wherein like reference numbers designate the same part in all the views, and with particular reference to Figures 1–5, 10 generally indicates the record identification device which is essentially comprised of a tab member 11 and an attachment means 12 for detachably securing the tab member to a phonograph record 14. Tab 11 may be formed of any suitable, substantially rigid, light weight material such as metal or plastic, and may be made in any desired shape as long at it contains sufficient surface area to enable brief identification indicia to be placed thereon. To this end, one side 15 of the tab will be painted or otherwise treated to provide a surface upon which identifying information can be written or printed, or, in the alternative, paper bearing the information can be adhesively secured to the tab.

Figure 2:
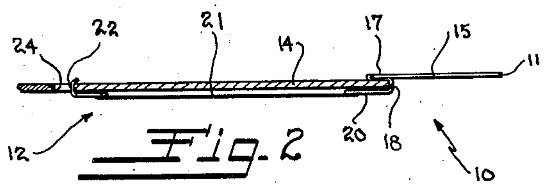
Figure 2 is a side elevation of the identification device of Figure 1 with a portion of the record being shown in section.
Figure 3:
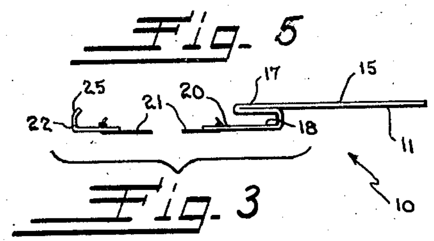
Figure 3 is an enlarged side elevation of the hook element and a portion of the tab member of the identification device of Figures 1 and 2.

Projecting outwardly from one edge of the tab 11 is a lug 17 which, in case of a metal tab, is bent back upon itself and then bent in the reverse direction to form a groove or channel 18 engageable with the peripheral edge of the record, the record edge being received in the channel so that the tab projects outwardly therefrom as shown. The attachment means 12 for the tab is secured to the lower side 20 of the channel 18, and comprises an elastic member 21, such as an elastic cord, and a hook element 22 fastened to the inner end of the elastic member. Hook element 22 is adapted to engage the center or spindle hole 24 of the record as best shown in Figure 2, and in so doing it places the elastic member under tension so that the tab 11 is maintained in position on the record with its channel in engagement with the peripheral edge thereof.

Figure 1:
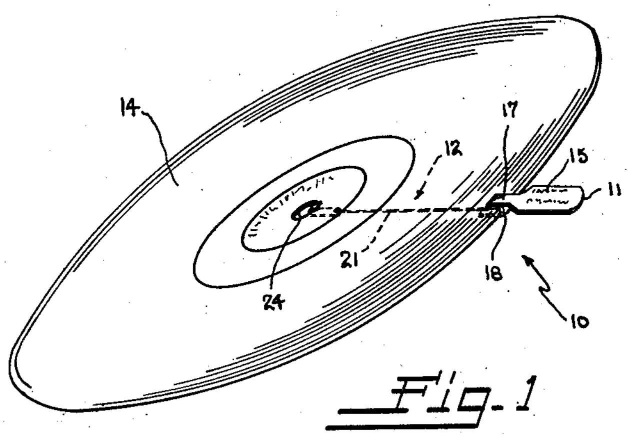
Figure 1 is a perspective view of a disc phonograph record with a record identification device embodying the invention attached thereto.
Figure 4:
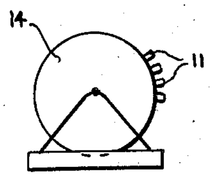
Figure 4 is a side elevation of a record rack showing the manner in which an identification device embodying the invention might be attached to records stored in the rack.
Figure 5:
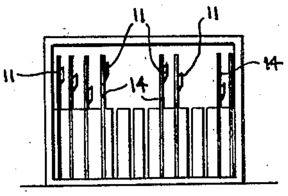
Figure 5 is a front elevation of a record cabinet showing the manner in which an identification device embodying the invention might be attached to records stored in the cabinet.

Since the member 21 has considerable elasticity, the identification device can be employed with either 10" or 12" disc records, the member merely being placed under greater tension in the latter case. The device is attached to a record by engaging the hook element 22 in the center hole 24 and pulling outwardly on the tab until the edge of the record is received within the tab channel. Records bearing identification devices can be positioned in the rack or cabinet, as shown in Figures 4 and 5 respectively, so that the tabs 11 are staggered, thereby enabling identification of the records at a glance.

When a particular record is sought, it is located by means of its tab which can then be used to withdraw the record from the rack eliminating the necessity of placing the fingers on the record grooves which is undesirable. Before placing the records on the phonograph, the identification device is removed from the record by simply pulling outwardly on the tab to disengage the record edge from the tab channel, and then moving the tab inwardly to release the tension on member 21 whereupon the hook element 22 drops out of the center hole 24. To this end, the hook element can, if desired, be formed with a very short inwardly turned upper edge 25, Figure 3, to facilitate the disengagement.

Figure 6:
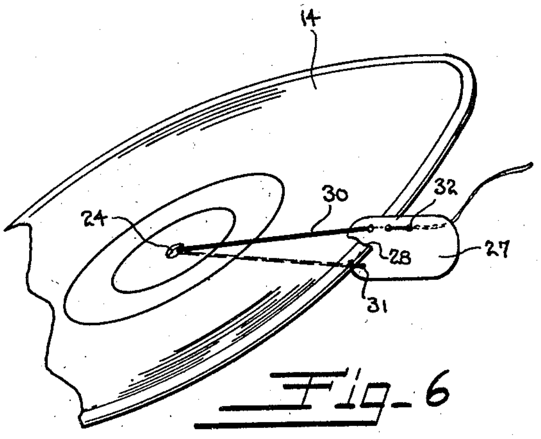
Figure 6 is a perspective view of a record with a modified form of identification device attached thereto.
Figure 7:
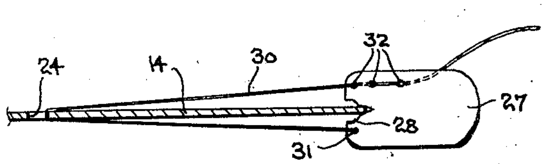
Figure 7 is a side elevation of the identification device of Figure 6 with a portion of the record being shown in section.

Figures 6 and 7 illustrate a slightly modified form of the invention wherein the tab member 27 is preferably formed of plastic material and is cut away adjacent one edge to form a record receiving groove 28. The attachment means for the tab is a flexible cord 30 of plastic, or the like, one end of which is fixedly secured to the tab at 31. The free end of the cord 30 is adapted to be threaded through the center hole 24 of the record and then secured to the tab by weaving it in and out of two or more of the holes 32 formed therein. By pulling the free end of the cord tight, all slack is removed therefrom and the tab 27 is maintained in edge engaging position as shown. With this arrangement, as in the first described modification, the identification device is removed from the record by simply pulling outwardly on the tab, this action serving to withdraw the free end of the cord 30 from the tab holes 32 and record center hole 24.

Figure 8:
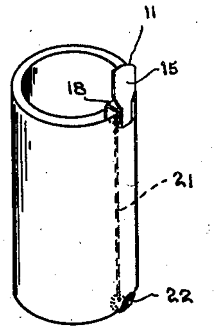
Figure 8 is a perspective view of the wax type cylinder with the identification device of Figure 1 attached thereto.

While the invention has been particularly described with respect to disc type phonograph records, it is also applicable to other type phonograph records as for example, wax cylinders. Figure 8 illustrates an identifying device as shown in Figures 1–5 applied to a cylindrical record, the tab channel 18 engaging the upper marginal edge of the cylinder and the hook element 22 engaging the lower edge thereof.

From the foregoing description it will be apparent that the present invention provides a novel and highly practical identification device for phonograph records. The device is particularly adapted for enabling rapid identification of records stored in racks or cabinets, and may be advantageously utilized since it is quick and easy to operate, is non-injurious to the records, and can be produced and sold at a very low cost. The invention may be embodied in other specific forms without departing from the spirit or essential characteristics thereof. The embodiments disclosed are therefore to be considered in all respects as illustrative and not restrictive, the scope of the invention being indicated by the appended claims.

What is claimed is:

1. An identification device for disc phonograph records comprising a tab member of sufficient size to receive record identifying information thereon, said tab member being formed with a narrow width groove adjacent the edge thereof to loosely receive a small portion of the peripheral edge of the record so that the tab member projects outwardly therefrom, and flexible attachment means secured to said tab member and engageable with the center hole in the record to maintain the edge of the record in said groove, said attachment means being releasable from the center hole in the record when said tab member groove has been disengaged from the peripheral edge of the record.

2. A device as defined in claim 1 wherein said attachment means comprises an elastic member and a hook element secured to one end of said member and engageable with the center hole in the record.

3. A device as defined in claim 1 wherein said attachment means comprises a flexible cord member fixedly secured to said tab member at one end and releasably secured to the tab member at the other end.

4. A detachable identification device for a disc phonograph record comprising a substantially rigid tab member bearing identifying information, said tab member having a narrow integral lug projecting from one edge thereof, said lug having a reverse bend therein to form a channel loosely engageable with the peripheral edge of the record, an elastic member secured at one end to one side of said channel, and a hook element secured to the other end of said elastic member and engageable with the center hole in the record, said hook element and elastic member coacting to maintain the edge of the record in said channel.

5. An identification device for a phonograph record comprising a tab member adapted to project outwardly from the peripheral edge of the record and bear record identifying information visible when the record is stored edgewise in a rack, a narrow width channel formed at the inner edge of said tab member to loosely receive a small portion of the marginal edge of the record, and flexible attachment means secured to said channel and engageable in the center hole of the record to releasably hold the edge of the record in said tab member channel whereby the record can be removed from a rack by pulling outwardly on the tab member.

6. An identification device for a disc phonograph record comprising a tab member adapted to project outwardly from the peripheral edge of the record and bear record identifying information visible when the record is stored edgewise in a rack, a narrow width channel formed at the inner edge of said tab member to loosely receive a small portion of the marginal edge of the record, an elastic cord secured at one end to said channel, and a substantially J-shaped hook element secured to the other end of said cord and engageable in the center hole in the record, said hook element and cord coacting to maintain the edge of the record in said channel.

References Cited in the file of this patent

UNITED STATES PATENTS

| | | |
|---|---|---|
| 801,518 | Fries | Oct. 10, 1905 |
| 1,216,468 | Lee | Feb. 20, 1917 |
| 1,503,410 | Yates | July 29, 1924 |
| 1,534,223 | La Port | Apr. 21, 1925 |
| 2,535,262 | Brownsey | Dec. 26, 1950 |